May 13, 1952

J. A. TEMPLETON 2,596,736

FUEL SUPPLY SYSTEM

Filed Sept. 24, 1946

John A. Templeton
INVENTOR.

BY
HIS ATTORNEY

May 13, 1952 J. A. TEMPLETON 2,596,736
FUEL SUPPLY SYSTEM
Filed Sept. 24, 1946 2 SHEETS—SHEET 2

John A. Templeton
INVENTOR.

HIS ATTORNEY.

Patented May 13, 1952

2,596,736

UNITED STATES PATENT OFFICE 2,596,736

FUEL SUPPLY SYSTEM

John A. Templeton, Hollis, Okla.

Application September 24, 1946, Serial No. 699,055

6 Claims. (Cl. 219—38)

This invention relates to improvements in fuel supply systems, particularly for internal combustion engines, and is especially adapted for use in the vaporization of combustible mixtures from low grade hydrocarbon fuels.

Heretofore the burning of low grade hydrocarbon fuels in internal combustion engines has presented many difficulties that have made these unsatisfactory for use. If burned at too low a temperature, combustion would result in a residue remaining in the combustion chamber of the engine which would find its way into the crank case of the engine, thereby diluting the lubricating oil. If the low grade hydrocarbon fuel was heated to too high a temperature, spontaneous combustion may result within the intake manifold, causing serious injury to the engine and its connected mechanism.

The object of this invention is to improve the construction of fuel supply systems for internal combustion engines to provide for the vaporization of low grade hydrocarbon fuel in a practical and effective manner and to insure the proper functioning thereof, and the effective vaporization of the fuel, so as to obtain the maximum vaporization without danger of spontaneous combustion within the intake manifold or other portion of the engine.

This object is accomplished preferably by the heating of atomized fuel to accomplish a thorough vaporization thereof, suitable for combustion within the engine. The atomized fuel is directed through a heating chamber that has provision not only for heating the fuel, but also for permitting expansion thereof under heat to provide for the proper combustion of the fuel when it reaches the internal combustion engine. A special carburetor is used preferably for atomizing the hydrocarbon fuel with means for directing the atomized fuel into frustro-conical tubes where heat is applied and in which the fuel is permitted to expand due to the breaking down of the molecular structure of the fuel by the heating and expansion thereof.

One embodiment of the invention is illustrated in the accompanying drawings in which.

Figure 1:
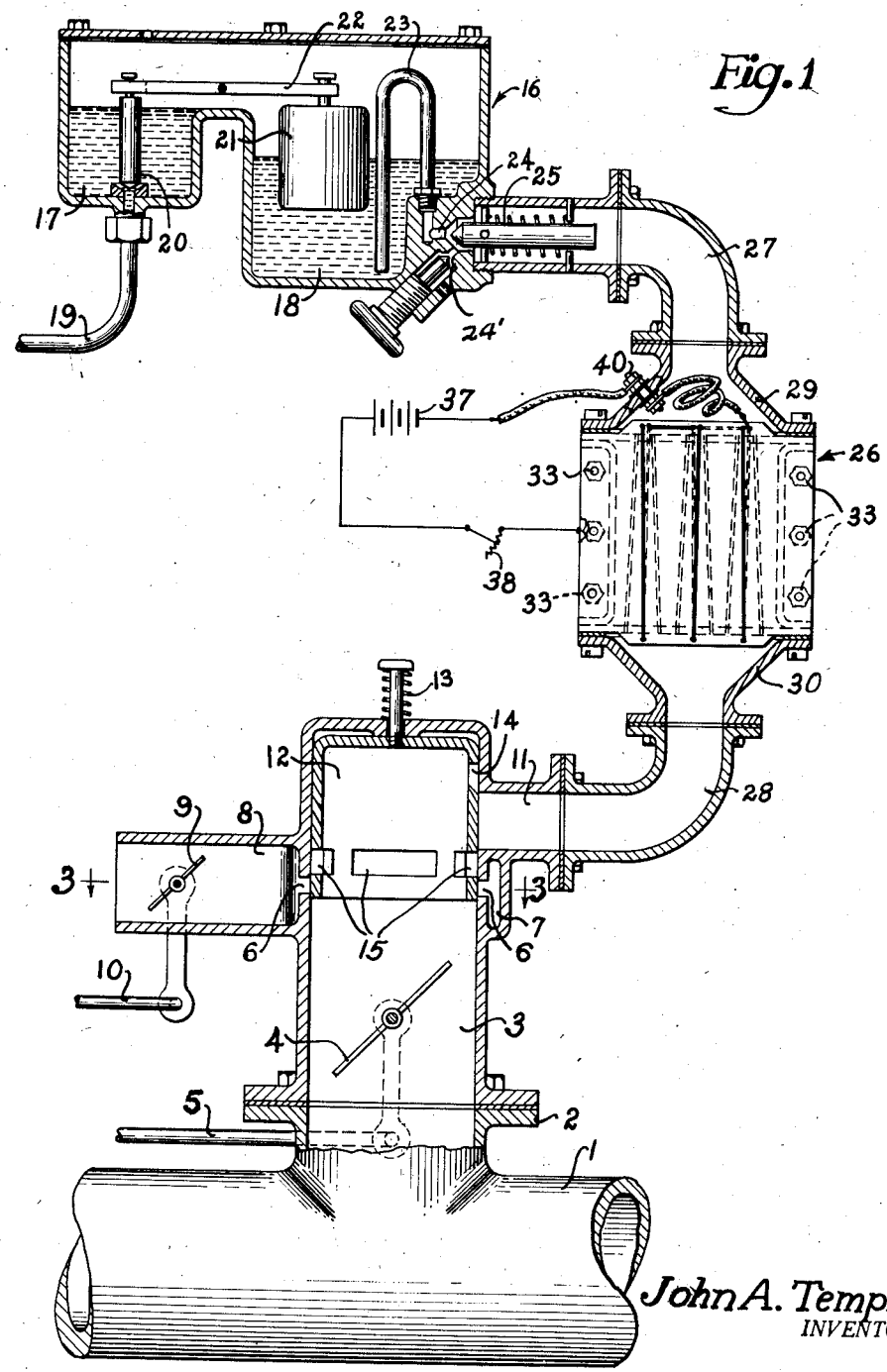
Fig. 1 is a vertical sectional view, partly in elevation and partly diagrammatic, to illustrate one form of the invention as applied to an engine manifold.

The invention is adapted to be used for the supplying of fuel in vapor form to an internal combustion engine through the usual manifold, generally indicated at 1 in Fig. 1, and which is provided with a flanged neck 2 through which the fuel may be supplied.

Connected with the flanged neck 2 of the manifold is a mixing chamber 3 adapted to mix vaporized fuel with air to form a combustable mixture that may be supplied to the manifold 1, for combustion in the engine. The mixing chamber 3 is provided with a throttle valve 4 therein, shown as the usual butterfly valve having a control 5 connected therewith.

The mixing chamber 3 has a circumferential air inlet 6 therearound within a collar 7 for admitting air into the mixing chamber from an air inlet 8 at one side thereof. The air inlet 8 is provided with a control valve 9, such as a butterfly valve operated by a rod 10.

The mixing chamber 3 also has a fuel inlet at 11 at a point adjacent the air inlet 6. The supply of air and vaporized fuel is controlled by a sleeve valve 12, slidably mounted axially of the chamber 3 and normally held in its upper position by a spring 13 connected therewith. The sleeve valve 12 has a vapor inlet port 14 in position to register with the vapor inlet 11 and having circumferentially disposed air inlet ports 15 in position to register with the air inlet 6, when the valve 12 is moved to a lower position than is shown in Fig. 1. The valve 12 is forced downward by suction created in the manifold 1, as a result of action of the pistons in the engine.

Vaporized fuel may be supplied to the mixing chamber 3 through the fuel inlet 11 from an atomizer and vaporizer constructed to vaporize low grade hydrocarbon fuels. These elements are shown as separate devices, although it will be obvious that they may be combined as desired.

The atomizer is designated generally at 16 and includes inlet and float chambers 17 and 18. The inlet chamber is adapted to receive the liquid fuel through a pipe 19, under control of a valve 20. The valve 20 is regulated in its open and closed positions by a float 21, operatively mounted in the chamber 18 and connected with the valve by a lever 22. Thus, the position of the float 21, will regulate the quantity of liquefied fuel admitted to the chamber 17 from the pipe 19, normally keeping the chamber 17 full and allowing an overflow into the float chamber 18. When the liquid level in the chamber 18 drops due to the discharge of fuel therefrom, the lowering of the float 21 opens the valve 20 and allows more fuel to be supplied thereto by gravity, a fuel pump or other suitable pressure means.

The float chamber 18 is provided with a discharge tube 23, one end of which is open adjacent the bottom of the chamber 18 and the tube extends upward in an inverted U, the opposite end being connected with a valve seat 24 in position to be engaged by a spring-pressed valve 25. The valve 25 normally is closed, except when withdrawn from engagement with its seat by suction communicated thereto from the intake manifold 1, which suction will serve not only to open the valve 25 but also to such liquid fuel through the tube 23 to the discharge port 24. As this fuel is discharged at the valve seat 24, it strikes the conical end of the valve 25 and is atomized as it is directed from the atomizer 16. Air is drawn in at the metered port 24' to aid the atomization of the liquid fuel at the valve.

A vaporizing device generally indicated at 26 is connected with an atomizer 16 and with the mixing chamber 3 through pipe connections 27 and 28 that are attached respectively to the discharge side of the atomizer 16 and to the vapor inlet 11 of the mixing chamber 3. These pipe connections are secured to heads 29 and 30, on respectively opposite sides of the vaporizing device 26.

Figures 2, 3:
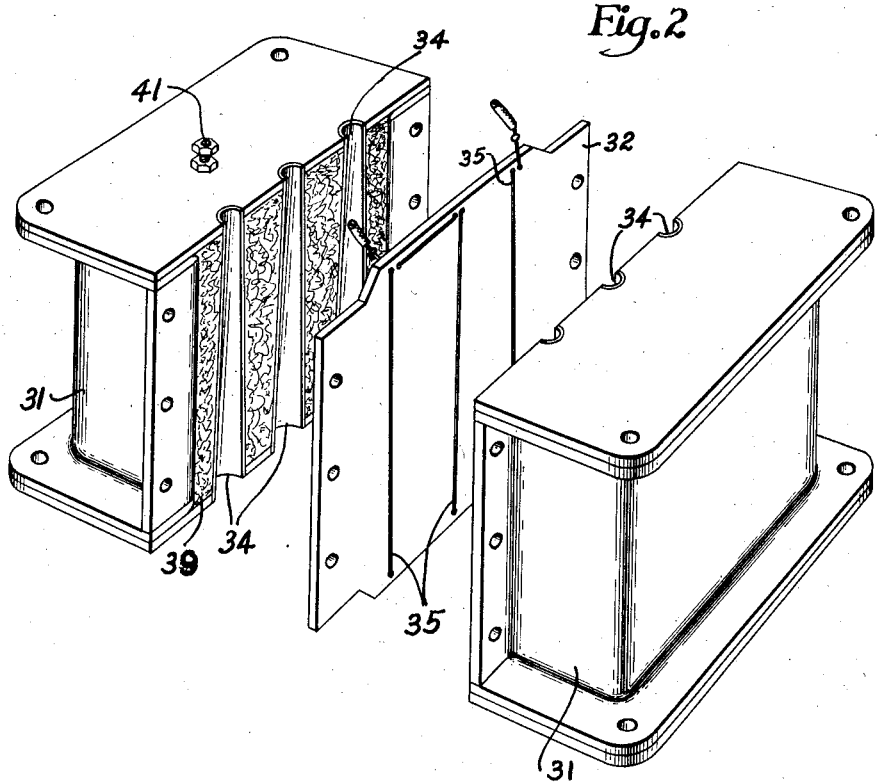
Fig. 2 is a disassembled perspective view of the vaporizing device.
Fig. 3 is a detail sectional view through the mixing chamber on the line 3—3 of Fig. 1.

The construction of the vaporizing device 26 is shown more in detail in Fig. 2. This device includes separate body sections 31, complementary with each other. These body sections are separated from each other by an insulating plate 32 formed of electrical insulating material, while the parts are secured together by bolts 33 extending through the flanges thereof and securing these parts in sealed relation with each other.

Extending lengthwise through each of the body sections 31 are tubes 34, each of which tubes is shown as semi-cylindrical with a diverging lower end, so as to be somewhat frustro-conical, and thereby form a vertical passageway through the tube 34 from the top to the bottom of the vaporizing device 26. The upper ends of the tubes 34 are in open communication through the head 29 with the inlet pipe 27 from the atomizer 16. The lower ends of these tubes are in open communication through the head 30 and the pipe 28, with the inlet 11 of the mixing chamber 3. Thus the tubes will allow the fuel to pass downward through the vaporizing device and as it is heated therein, the atomized fuel will be expanded in the diverging portions of the tubes.

Provision is made for heating the fuel as it passes through the tubes 34 for which purpose I have provided heating elements comprising lengths of resistance wire 35, such as a "Nichrome" heating element, which wire is supported on the insulating plate 32 and is threaded through holes in the plate, so as to provide a length of wire on each side of the plate 32, within each of the tubes 34, so as to vaporize the atomized fuel passing therethrough when electric current is supplied to this heating element. The opposite sides of the heating element 35 are adapted to be connected with an electric circuit, including a source of electric current, such as a battery 37, and preferably a control element, such as a rheostat 38.

These parts are detachably connected together so that by removal of the bolts 33, the electric element may be removed readily for repair when desired. Provision is made for insulating the vaporizing device by means of insulating material 39 which fills the body sections 31 around and between the tubes 34.

The operation of the system will be evident from the foregoing description. It is apparent that the liquid fuel is admitted to the atomizer 16 and is discharged through the valve 24—25 therefrom, in the form of atomized particles, as a result of the suction created by the operation of the pistons in the engine. This atomized fuel is drawn downward through the pipe connection 27 and through the tubes 34 where heat is applied thereto by the electric heating elements 35. This heat is sufficient to cause a complete vaporization of the atomized fuel and the vapor resulting therefrom is directed through the pipe connection 28 to the inlet 11 of the mixing chamber 3.

The suction resulting from the operation of the engine pistons having previously opened the valve 12, sufficient to move the port 14 into registry with the vapor inlet 11, causes this vapor to continue into the mixing chamber 3. At the same time, the air ports 15 are in registry with the air inlet 6 and air is therefore drawn into the mixing chamber to be mixed with the vaporized fuel and thereby form a combustible mixture.

A binding post is shown at 41 secured to the body 31 for attachment of a ground wire thereto, if desired.

The application of heat to the atomized fuel permits the use of even low grade hydrocarbon fuels which, nevertheless, forms an effective vapor that may be used in the internal combustion engine.

While the invention has been illustrated and described in one embodiment, it is recognized that variations and changes may be made therein, without departing from the invention, except as specified in the claims.

I claim:

1. In a fuel supply system for an internal combustion engine, a vaporizing device comprising means forming a multiplicity of tubular passageways for flow of the fuel therethrough, said passageways each having diverging side walls in the direction of fuel flow, and an electrical heating element directly exposed to contact with the fuel during flow through said passageways.

2. In a fuel supply system for an internal combustion engine, a vaporizing device including means forming a plurality of tubular passageways for flow of fuel therethrough, said passageways having diverging side walls in the direction of fuel flow, and an electric heating element mounted on a flat insulating member that is interposed between portions of said split vaporizing device and extending lengthwise of the passageways for heating the fuel during passage therethrough.

3. In a fuel supply system for an internal combustion engine, a vaporizing device comprising a pair of complementary members each having a plurality of half tube passageways therein, a flat insulated member interposed between said complementary members and said flat insulated member in fluid tight relation, so said fuel will flow through said passageways, each of said passageways having side walls diverging in the direction of fuel flow, and electric heating elements arranged in proximity to the respective passageways in heat exchange relation therewith for heating the fuel during flow through said passageways.

4. In a fuel supply system for an internal combustion engine, a vaporizing device comprising casing sections having an interposed insulating sheet therebetween, each of said casing sections including a plurality of unobstructed passageways therethrough for flow of fuel through said passageways on opposite sides of the insulating sheet, and an electric heating element carried by the sheet in direct heat exchange relation to the respective passageways for heating the fuel passing therethrough, each of said passageways diverging in the direction of the flow of fuel therethrough.

5. In a fuel supply system for an internal combustion engine, a vaporizing device comprising casing sections having an interposed insulating sheet therebetween, each of said casing sections including a plurality of unobstructed passageways therethrough for flow of fuel through said passageways on opposite sides of the insulating sheet, an electric heating element carried by the sheet in direct heat exchange relation with the respective passageways for heating the fuel passing therethrough, each of said passageways being constructed with surrounding sides diverging in the direction of fuel flow, and heat insulating material surrounding the tubular passageways within the casing sections.

6. In a fuel supply system for an internal combustion engine, a vaporizing device comprising casing sections having an interposed insulating sheet therebetween, each of said casing sections including a plurality of unobstructed passageways therethrough for flow of fuel through said passageways on opposite sides of the insulating sheet, electric heating means carried by the sheet in direct heat exchange relation with the respective passageways for heating the fuel passing therethrough.

JOHN A. TEMPLETON.

REFERENCES CITED

The following references are of record in the file of this patent:

UNITED STATES PATENTS

| Number | Name | Date |
| --- | --- | --- |
| 1,089,884 | Vollbrecht | Mar. 10, 1914 |
| 1,150,115 | Heinze | Aug. 17, 1915 |
| 1,155,726 | Harroun | Oct. 5, 1915 |
| 1,333,933 | Nichols | Mar. 16, 1920 |
| 1,415,184 | McIlrath et al. | May 9, 1922 |
| 1,427,094 | Daniel | Aug. 29, 1922 |
| 1,435,989 | Simon | Nov. 21, 1922 |
| 1,472,233 | Taylor, Jr., et al. | Oct. 30, 1923 |
| 1,673,568 | Johnson | June 12, 1928 |
| 1,722,037 | Corser | July 23, 1929 |
| 1,931,379 | Graziano | Oct. 17, 1933 |
| 2,029,666 | Markwart | Feb. 4, 1936 |
| 2,320,528 | Loeffler et al. | June 1, 1943 |